United States Patent [19]

Henricson

[11] 4,093,508
[45] June 6, 1978

[54] PROCESS FOR RECOVERING CHEMICALS FROM THE WASTE LIQUORS OF SULFATE CELLULOSE DIGESTION AND THE WASTE WATERS OF BLEACHING

[75] Inventor: Kaj Olof Henricson, Kauniainen, Finland

[73] Assignee: A. Ahlstrom Osakeyhtio, Finland

[21] Appl. No.: 556,974

[22] Filed: Mar. 10, 1975

[30] Foreign Application Priority Data

Mar. 12, 1974 Finland .................................. 743/74

[51] Int. Cl.² .............................................. D21C 11/12
[52] U.S. Cl. ............................ 162/30 K; 162/DIG. 8; 423/207; 423/DIG. 3
[58] Field of Search ................. 423/182, 207, DIG. 3; 162/17, 30, 33, DIG. 8

[56] References Cited

U.S. PATENT DOCUMENTS

| | | | |
|---|---|---|---|
| 2,862,887 | 12/1958 | Boyer | 162/30 R |
| 3,120,464 | 2/1964 | Berser | 162/33 |
| 3,453,174 | 7/1969 | Rapson | 162/30 R |
| 3,698,995 | 10/1972 | Rapson | 162/30 R |
| 3,740,307 | 6/1973 | Rapson et al. | 423/207 |
| 3,740,308 | 6/1973 | Rapson et al. | 423/207 |
| 3,746,612 | 7/1973 | Rapson | 423/207 |
| 3,909,344 | 9/1975 | Lukes | 423/207 X |
| 3,945,880 | 3/1976 | Lukes et al. | 423/207 X |
| 3,950,217 | 4/1976 | Reeve | 423/207 X |
| 3,954,552 | 5/1976 | Lukes et al. | 423/207 X |
| 3,986,923 | 10/1976 | Reeve | 423/207 |

Primary Examiner—O. R. Vertiz
Assistant Examiner—Gary P. Straub
Attorney, Agent, or Firm—Bucknam and Archer

[57] ABSTRACT

A process for the recovery of chemicals from the waste liquors of sulfate cellulose digestion and from the waste waters of bleaching, wherein a melt from a soda-ash roaster, mainly containing sodium sulfide and sodium carbonate, but also sodium chloride, is dissolved and clarified to produce green liquor containing carbonate, sulfide and chlorides is dissolved. The carbonate is separated from the sulfide and the chlorides, at least part of the sodium chloride is separated from the sulfide in solution, at least part of the carbonate is causticized into hydroxide, and the hydroxide and sulfide in solutions is mixed together in a ratio suitable to form a digestion solution with a desired sulfide content.

3 Claims, 2 Drawing Figures

PROCESS FOR RECOVERING CHEMICALS FROM THE WASTE LIQUORS OF SULFATE CELLULOSE DIGESTION AND THE WASTE WATERS OF BLEACHING

BACKGROUND OF THE INVENTION

The present invention relates to a process for the recovery and reuse of sodium and sulfur chemicals in connection with sulfate cellulose production, whereby the chlorine chemicals are simultaneously removed from the liquor system in the form of sodium chloride.

There are advanced processes for the recovery and reuse of digestion chemicals. So far, bleaching chemicals have not been recovered to a noteworthy extent. This is unfortunate, considering environmental pollution caused by the chemicals used for bleaching and by dissolved organic materials when they are discharged into the sewage system.

It is possible to use the waste water flow from the bleaching apparatus either entirely or partially for washing the digestion chemicals from cellulose. Besides, the waste flow from the bleaching apparatus can be used for dissolving the melt coming from the soda-ash roaster. The waste water coming from the bleaching apparatus can, furthermore, be used instead of condensation water and clean water at several other stages of the recovery system for digestion chemicals, not mentioned here.

The waste water flow coming from the bleaching system can be purified and then released into the sewage pipe. The purification can be performed by, for example, an ion exchange or calcium hydroxide treatment. In this case, however, there is the problem of what could be done with the chemicals and organic compounds removed from the waste water. In both of the methods for purifying waste water mentioned above, the purpose is to feed these chemicals and organic compounds into the recovery system for digestion chemicals. The waste water flows of the bleaching apparatus can be purified in other ways as well, and the removed substance can be led into the digestion chemical system.

In the recovery and purification systems for the bleaching system waste water described above, organic and inorganic substances are fed into the digestion chemical system. Various substances can be fed into the digestion chemical system even in other ways. The combustible substances are burned either in a soda-ash roaster or in a caustic-sludge furnace and then removed from the system. The incombustible substances, such as sodium chloride, remain mainly in the liquor system, unless they are removed or unless they are eliminated from the system in the form of losses incurred during the process.

When cellulose is bleached by means of oxygen gas, sodium is fed into the digestion chemical system along with the bleaching residues at either the recovery or the purification stage.

In chlorine bleaching, chlorine and possibly sodium are fed into the system at either the recovery or the purification stage. The present invention relates to a process for removing chlorine, sodium and sulfur from the system, whereby sulfur-free and chlorine-free sodium hydroxide is simultaneously produced for bleaching or the other unit processes. The invention makes it possible to control the sulfide content of the digestion solution in a simple manner.

There are also other processes for removing chlorides from the liquor system. Four processes are described below, but only in Process 3 has the sodium and sulfur balance control been taken into consideration.

1. Leaching of the chloride-containing dust from the soda-ash roaster. This process produces, however, a white liquor with a chloride content many times that produced by the process according to the invention.

2. Removal of sodium chloride from the white liquor by means of evaporation crystallization. The chloride content obtained for the white liquor by the process is about 3 times that obtained by the process now proposed. The evaporation requirement is, however, more than twofold. The greatest disadvantage of the process is the great carbonate quantity which is precipitated together with the chloride crystals and which must be recovered by leaching.

3. Separation of the carbonate and chloride from the green liquor by evaporation crystallization. After separation, the crystals are dissolved and the solution is causticized, whereafter the chlorides are removed by evaporation crystallization. The process has the same disadvantage as Process 2. Besides, the evaporation requirement is even greater than in Process 2.

4. Separation of the carbonate and chloride from the melt by leaching. This process is hardly practicable for the reason that the leaching is very difficult to perform.

SUMMARY OF THE INVENTION

According to the present invention, a melt from a soda-ash roaster, mainly containing sodium sulfide and sodium carbonate, but also sodium chloride is dissolved and clarified to produce a green liquor containing carbonate sulfide and chlorides. The carbonate is separated from the sulfide and the chlorides then at least part of the sodium chloride is separated from the sulfide in solution, at least part of the carbonate is causticized into hydroxide, and the hydroxide and sulfide in solutions are mixed together in a ratio suitable to form a digestion solution with a desired sulfide content.

DESCRIPTION OF THE PREFERRED EMBODIMENTS

Figure 1:
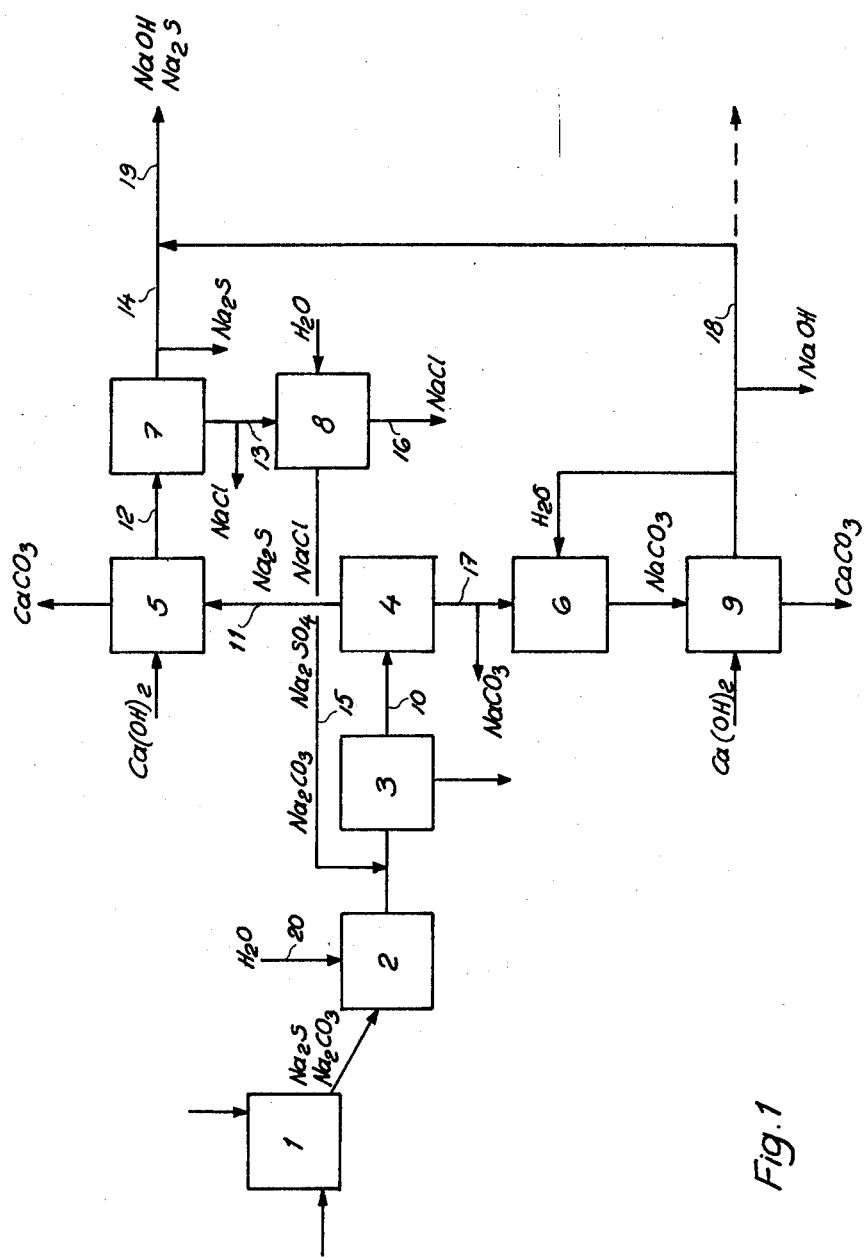
FIGS. 1 and 2 depict the flow diagrams of two systems meant for applying the process according to the invention.

FIG. 1 depicts a flow diagram in which the waste liquor is burned in the soda-ash roaster 1 and the obtained melt, which mainly consists of sodium carbonate and sodium sulfide, is dissolved in the dissolving unit 2, thereby producing green liquor. The waste water flow 20 from the bleaching unit is fed into the dissolving unit. The green liquor is cleared in the settler 3, whereafter it is fed into the sodium carbonate separator 4.

The sodium carbonate is separated by crystallization from the green liquor 10 fed into the separator; the crystallization is performed in such a manner that the chlorides remain in the mother liquor. The crystallization can best be performed by cooling, since the carbonate is then precipitated in the form of a decahydrate, which reduces the evaporation requirement. The flow 11 from the soda separator, containing a great quantity of sulfide, is fed into the causticization apparatus 5 for the removal of the remaining carbonate, although this is not always necessary. The causticization can best be performed by slaking, in a sulfide solution, the entire quantity of lime required in the liquor system, whereby water is combined with the lime, which reduces the evaporation requirement in the crystallization apparatus 7. Simultaneously, the large quantity of lime produces a rapid, high-degree causticization. The crystalline sodium carbonate 17 obtained from the soda separator 4 is dissolved in the dissolving apparatus 6 and fed into the causticization apparatus 9. Thereby a solution 18 is obtained which mainly contains sodium hydroxide, although certain impurities may be present. The sodium hydroxide solution is used for preparing the digestion liquor, but it can also be used in any unit processes in which sodium hydroxide is required.

The flow 11 consists of a sulfide solution in which certain impurities are present; above all sodium chloride is significant among the impurities. The flow 11 contains only a small part of the sodium carbonate because a great part of it has been separated in the separator 4. If the flow 11 is causticized, most of the sodium carbonate present in it is converted into sodium hydroxide, in which case it can be assumed that the flow 12 leaving the causticization apparatus contains very little carbonate. The sulfide flow 12 is directed into the evaporation crystallization apparatus 7, in which the sodium chloride is precipitated in a crystalline form. It is possible to obtain a sodium chloride concentration of less than 4 percent by weight in the sulfide solution 14 leaving the crystallization apparatus, while the sodium concentration may rise to more than 25 percent by weight without the sodium sulfide precipitating in a crystalline form.

The crystalline material 13 contains certain impurities, above all sodium carbonate and sodium sulfate. Their quantities are, however, so small that they can usually be removed from the process together with the sodium chloride.

If the losses incurred during the process grow too great, the sodium carbonate and sodium sulfate can be recovered by leaching the crystalline material in the apparatus 8. The recovered chemicals 15 can be returned to some stage of the process, prior to the soda separator 4.

The digestion solution is prepared by mixing the flows 14 and 18 in a suitable ratio so that the correct sulfide content of the digestion liquor is obtained. Excess sodium present in this system can be easily removed in the form of crystalline sodium carbonate from the process flow 17. The excess sulfur can be removed in the form of a concentrated sodium sulfide solution from the process flow 14. The excess chlorine is removed in the form of crystalline sodium chloride from the process flows 13 and 16.

Figure 2:
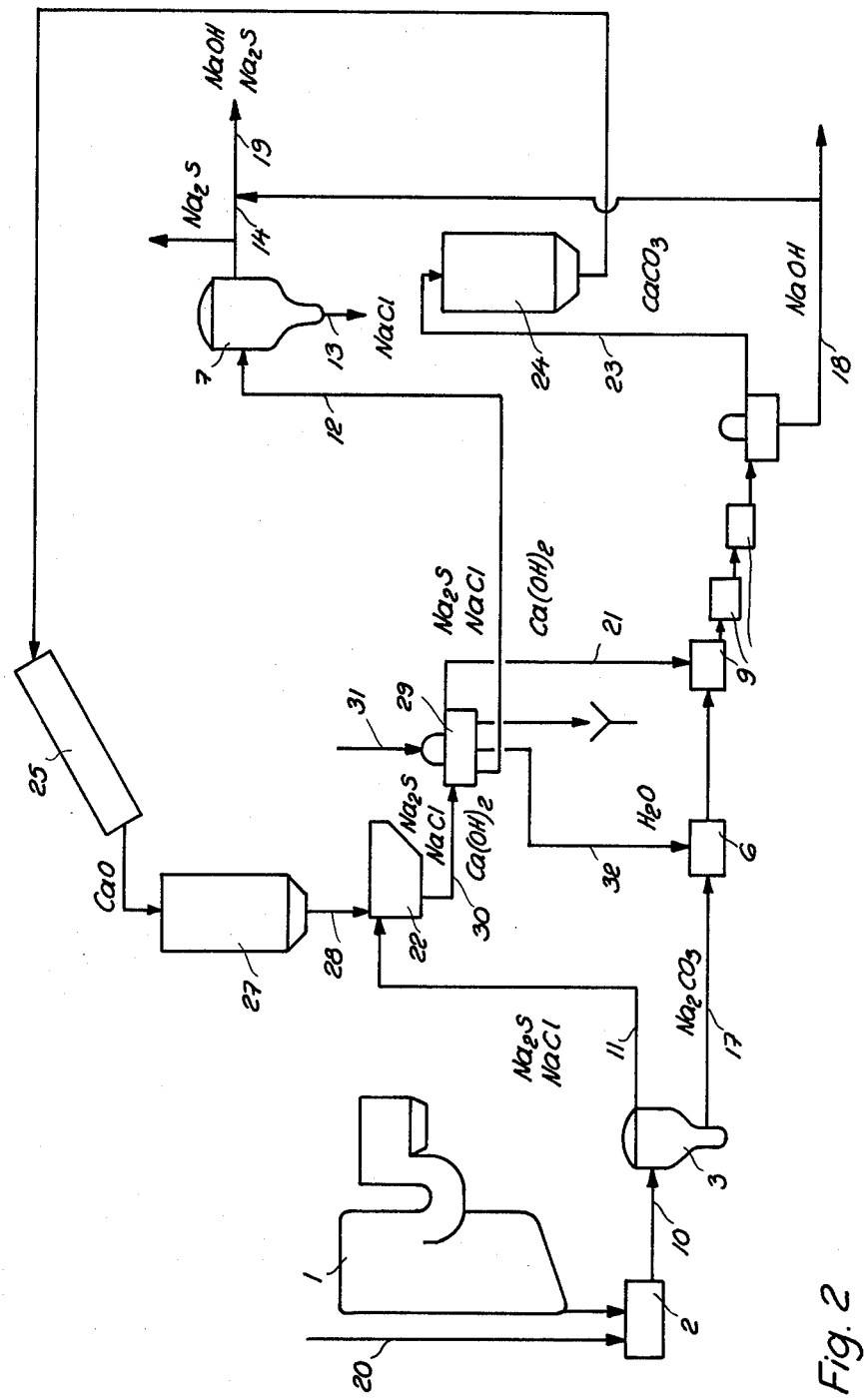

FIG. 2 depicts an embodiment in which the entire lime amount 21 required for the causticization is slaked in a sulfide solution. In the figure, 23 indicates the caustic sludge flow from the causticization apparatus, mainly $CaCO_3$, 24 indicates the caustic-sludge storage, 25 the caustic-sludge furnace in which the caustic sludge is burned into calcium oxide, 27 indicates the lime storage, and 28 the flow from there into the lime slaking apparatus 22. In the lime slaking unit, the carbonate present in the sulfide solution is converted into hydroxide. The sulfide solution 12, the flow 21 containing calcium, and the purified water 32 to be fed into the dissolving apparatus 6 are separated from each other in the filter 29, into which the waste water flow 31 from the bleaching unit is fed in addition to the sulfide solution 30 containing calcium.

The following example illustrates the process according to the invention. The green liquor being studied has a sulfide content of approx. 27%, which is very normal. The quantity of chloride fed into the liquor system is 20 kg of sodium chloride per one metric ton of green liquor. This chloride quantity must be removed.

| Process | Flow | $Na_2CO_3$ kg | $Na_2S$ kg | NaOH kg | NaCl kg | $H_2O$ kg |
|---|---|---|---|---|---|---|
| Green liquor | 10 | 180 | 50 | — | 30 | 740 |
| Crystallization-cooling | 11 | 27 | 50 | — | 30 | 480 |
| | 17 | 153 | — | — | — | 260 |
| Causticization | 12 | 2 | 50 | 19 | 30 | 450 |
| Crystallization-evaporation | 14 | 1.1 | 50 | 19 | 10 | 143 |
| | 13 | 0.9 | — | — | 20 | 0.3 |

By the process according to the invention it is thus possible to remove 20 kg of sodium chloride per 1 metric ton of green liquor from a green liquor which contains 30 kg of sodium chloride per one metric ton of green liquor. The purity of the chloride crystals is over 95%.

By starting with the carbonate flow 17 and by adding or removing sodium carbonate, the desired quantity of sodium hydroxide, devoid of both sulfur and chlorine, can be produced by causticization.

By starting with the flows 18 and 14, white liquor with the desired sulfide content can be produced. The mixing ratio of the flows 18 and 14 determines the concentration of sulfide. If excess sodium sulfide is thereby produced, the excess sulfur is removed in the form of a 23-percent sodium sulfide solution from the flow 14.

The solubility data of the example above are based on those given in available publications.

In no previously known processes (1–4) can 20 kg of sodium chloride be removed from a green liquor which contains only 30 kg of sodium chloride. This means that it is necessary to take a proportionately rather great chloride amount from the liquor system before obtaining a removed chloride quantity equal to that fed into it. Thus, more and more sodium chloride accumulates in the liquor system. For example, Process 2 yields an approx. threefold NaCl content in the white liquor. Thereby the NaCl content in the green liquor must rise as high as 50 kg before the necessary 20 kg can be removed. The chlorine content of the green liquor being less, e.g., 40 kg, only 10 kg can be removed and the remaining 10 kg remain in the liquor system, gradually raising the chlorine concentration until the removed quantity is equal to that fed into it. Since in the process according to the invention, the chloride crystals need not be washed, the evaporation requirement is less than in the previously known processes 2–4. Furthermore, the evaporation requirement is reduced by the fact that the carbonate is separated in the form of a decahydrate and that the calcium oxide is slaked in a sulfide solution.

What is claimed is:

1. In a process for the recovery of chemicals from the waste liquors of sulfate cellulose digestion and from the waste waters of bleaching, wherein the waste liquor from the digestion is concentrated by evaporation and the concentrated waste liquor is burned in a recovery boiler to produce a melt mainly containing sodium sulfide, sodium carbonate and sodium chloride, the melt is dissolved in the waste waters of bleaching and is clarified to produce green liquor containing sodium carbonate, sodium sulfide and sodium chloride and the carbonate and the chloride are separated from the green liquor, the improvement which consists of (1) separating sodium carbonate from the green liquor by crystallization under conditions to retain all the sodium chloride in the sodium sulfide-containing mother liquor said mother liquor being saturated with respect to sodium chloride, dissolving the crystallized sodium carbonate, causticizing at least a portion of the sodium carbonate solution with a causticizing agent which is calcium hydroxide to form sodium hydroxide, (2) causticizing the sodium carbonate-depleted sodium sulfide containing mother liquor with calcium hydroxide, to convert residual sodium carbonate to sodium hydroxide (3) concentrating by evaporating said mother liquor to precipitate sodium chloride, (4) separating sodium chloride therefrom and combining the resultant mother liquor containing sodium sulfide with the sodium hydroxide-containing solution in a ratio suitable to form a digestion solution with a desired sulfide content.

2. A process according to claim 1 in which the total amount of calcium hydroxide as causticizing agent is supplied as calcium oxide and the total amount of calcium oxide is first supplied to the sodium sulfide containing solution of step 2 where the calcium oxide is slaked to form calcium hydroxide in situ as the causticization agent whereafter the sodium sulfide solution formed in step 2 and the remaining calcium hydroxide together with the calcium carbonate from the causticization are separated from each other and the calcium hydroxide containing fraction is directed to be used for the causticization of the sodium carbonate solution in step 1.

3. A process according to claim 1 in which the calcium hydroxide is used prior to or after the causticization of the sulfide containing solution for the purification of the waste water from bleaching before it is directed to be used for the causticization of the sodium carbonate solution.

* * * * *